April 9, 1929.    L. ANKENBAUER    1,708,350

CANE CUTTER

Filed March 7, 1927

Lee Ankenbauer
INVENTOR

BY John M. Spellman
ATTORNEY

Patented Apr. 9, 1929.

1,708,350

UNITED STATES PATENT OFFICE.

LEE ANKENBAUER, OF STRAWN, TEXAS.

CANE CUTTER.

Application filed March 7, 1927. Serial No. 173,292.

This invention relates to improvements in cane cutters and the principal object thereof is to provide a cane cutter of few parts and of durable and practical construction.

The invention includes the embodiment of inwardly converging cutting knives carried on a platform, the latter being mounted upon runners, and further resides in guide means for directing the cane to the knives, and includes means for assisting the cutting of the stalks of cane by a revolvable element on the platform.

The new and improved cane cutter will be better understood from a perusal of the following detailed description, taken in connection with the accompanying drawings, forming part of this specification, and in which.

Proceeding in accordance with the drawings and wherein similar numerals indicate the various parts, 1 denotes the runners, spaced apart and upon which is attached a platform 2. The rear of the machine includes a supporting plate 3 which comprises in effect an extension of the platform 2.

Figure 1:
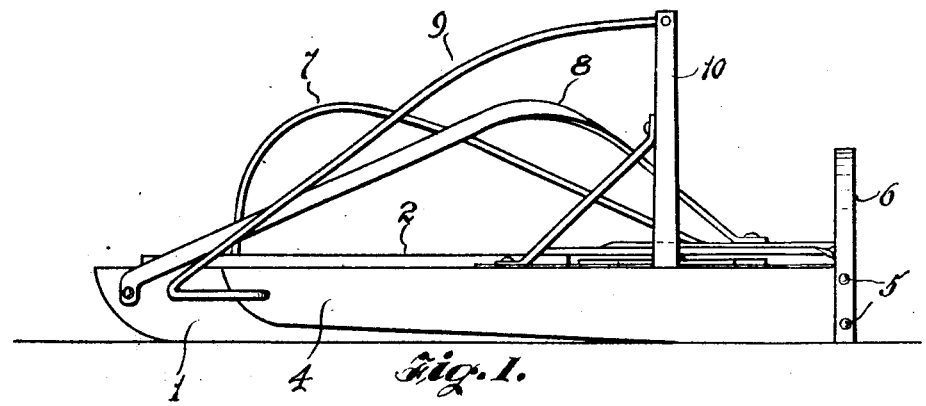
Figure 1 is a side elevational view of the cane cutter.
Figure 2:
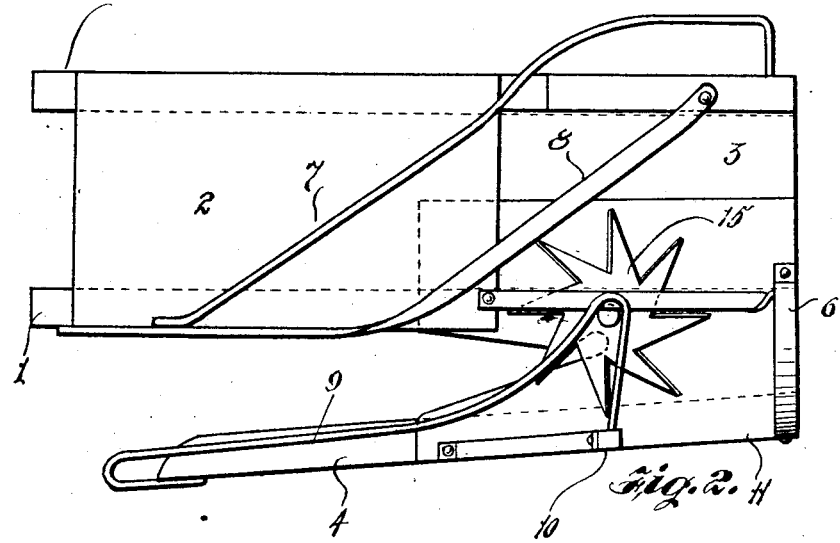
Figure 2 is a top plan view.

Spaced apart from one of the runners 1 is a guide arm 4, the rear end of which rests upon the ground, the front portion thereof being above the ground as depicted in Figure 1. As will be observed this guide arm is disposed at an angle to the runner 1, as shown in Figure 2 and is connected to the rear of the machine by bolts 5 and the curved member 6.

Secured to the runners and spaced apart in curved relation are guide bars 7 and 8, and attached to the guide arm 4 is a guide bar 9, the inward end of the latter bar being fastened to an upright or post 10.

Figures 3, 4:
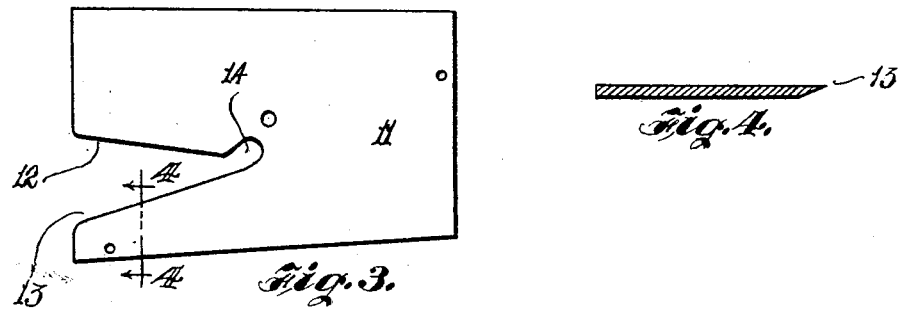
Figure 3 is a top plan view of the plate upon which the cutting mechanism is arranged.
Figure 4 is a detail cross-sectional view through a portion of the plate shown in Figure 3, and along the line 4—4.

The cutting means consists of a plate 11 cut diagonally to form the cutting edges 12 and 13, as shown in Figure 4. This plate is attached to one of the runners and to the guide arm 4 and the cutting edges 12 and 13 at their converging ends form a recess 14 in which a stalk of cane is received. The stalk is partly severed by the cutting edges 12 and 13 and the stalk after being directed into the recess 14 is completely severed, the succeeding stalks forcing the cutting edges against the star-shaped wheel 15. Depending upon the angle at which the stalk may be received between the converging cutting edges of the plate, some of the stalks will be completely severed before reaching the recess 14, but the star-shaped wheel will complete the operation of severance of the stalks should any of them not be completely severed between the cutting edges of the plate. If desired some means may be employed to connect the star-shaped wheel to the movement of the machine. Obviously, also, other changes may be made in the construction of the machine, in keeping with the appended claims.

I claim:

1. In a cane cutter, the combination of runners spaced apart from one of the runners, a plate spanning the guide arm and one of the runners; said plate having a V shaped cut-away portion terminating in a recess disposed of an angle to the cut-away portion, and including cutting edges.

2. In a cane cutter, the combination of runners spaced apart, a platform on the runners, a guide arm diagonally spaced apart from one of the runners, a plate spanning the guide arm and one of the runners; said plate having a V shaped cut-away portion terminating in a recess 14, and including cutting edges, a revolvable star shaped wheel adjacent the recess for assisting the cutting operation.

3. A cane cutter as set out in claim 2 and wherein said platform includes guide bars for directing the cane into and from the machine.

In testimony whereof I affix my signature.

LEE ANKENBAUER.